United States Patent
Yamaura et al.

(10) Patent No.: US 8,363,308 B2
(45) Date of Patent: Jan. 29, 2013

(54) FIBER OPTICAL DEVICE AND METHOD OF DRIVING THE SAME

(75) Inventors: Hitoshi Yamaura, Hamamatsu (JP); Hiroshi Sekiguchi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 372 days.

(21) Appl. No.: 12/863,626

(22) PCT Filed: Aug. 31, 2009

(86) PCT No.: PCT/JP2009/065203
§ 371 (c)(1),
(2), (4) Date: Jul. 20, 2010

(87) PCT Pub. No.: WO2010/047180
PCT Pub. Date: Apr. 29, 2010

(65) Prior Publication Data
US 2010/0290107 A1 Nov. 18, 2010

(30) Foreign Application Priority Data
Oct. 22, 2008 (JP) ................................. 2008-272359

(51) Int. Cl.
*H01S 3/00* (2006.01)
(52) U.S. Cl. .................... 359/333; 359/337.4; 359/337.1
(58) Field of Classification Search .................. 359/337, 359/337.1, 337.4
See application file for complete search history.

(56) References Cited

U.S. PATENT DOCUMENTS
6,452,717 B1 * 9/2002 Endo .............................. 359/337
7,872,794 B1 * 1/2011 Minelly et al. ............. 359/341.31

FOREIGN PATENT DOCUMENTS
WO 00/46889 8/2000

OTHER PUBLICATIONS

Manek-Honninger et al., "Photodarkening and photobleaching of an ytterbium-doped silica double-clad LMA fiber", Optics Express, vol. 15, No. 4, pp. 1606-1611 (Feb. 2007).
Noriyuki Inoue, et al., "4p-ZM-4, Study of Photobleaching Against Photodarkening of Yb Doped Fibers," The 69th Meeting, The Japan Society of Applied Physics, vol. 3, Inst. for Laser Science, Univ. Electro-Commun., Sep. 2, 2008, p. 1068 (with full English-language translation attached).

\* cited by examiner

*Primary Examiner* — Mark Hellner
(74) *Attorney, Agent, or Firm* — Drinker Biddle & Reath LLP

(57) ABSTRACT

A fiber optical device 1A includes an amplification optical fiber 10, a seed light source 15 for supplying pulse seed light to the optical fiber 10, excitation light sources 21 to 25 for supplying excitation light, a bleaching light source 40 for supplying bleaching light for reducing a light transmission loss caused by photodarkening, and a control device 50 that controls the operations of individual portions. The control device 50 divides a period between a first output light pulse and a succeeding second output light pulse into a first period which includes a time point immediately after the output of the first output light pulse and during which the population inversion is unsaturated, and a second period which includes a time point immediately before the output of the second output light pulse, and, to the optical fiber 10, supplies the bleaching light in the first period and supplies the excitation light in the second period. Thus, it is possible to provide a fiber optical device and the method of driving it that can suitably restore the characteristics of the amplification optical fiber by photobleaching.

10 Claims, 7 Drawing Sheets

FIBER OPTICAL DEVICE AND METHOD OF DRIVING THE SAME

TECHNICAL FIELD

The present invention relates to a fiber optical device that uses an amplification optical fiber having a core containing a laser active substance and to a method of driving such a fiber optical device.

BACKGROUND ART

As an optical device such as a laser device or an optical amplification device, a fiber optical device is known that uses an amplification optical fiber having a laser active substance such as Yb added thereto. In this type of optical device, with the active substance excited by supplying excitation light (for example, light with a wavelength of 975 nm) to the amplification optical fiber, seed light (light to be amplified) is input to the optical fiber, and thus the seed light is amplified by induced emission and the resulting light is output as output light from the optical fiber. When the optical device is configured as a laser device, a resonator is provided for the amplification optical fiber, and the amplified light performs lasing within the resonator, with the result that output laser light is generated.

Currently, fiber optical devices such as a Yb-doped fiber laser device are widely used for example as an industrial continuous operation type (continuous oscillation type) laser light source and the like. On the other hand, in a pulse operation type fiber optical device, an optical fiber deterioration phenomenon called photodarkening disadvantageously occurs, resulting from the supply of excitation light to the amplification optical fiber, over a wide range from an ultraviolet region to a near-infrared region (for example, see Non Patent Document 1). When the photodarkening occurs, a light transmission loss in the amplification optical fiber is increased.

CITATION LIST

Non Patent Document

Non Patent Document 1: I. Manek-Hoenninger et al., "Photodarkening and photobleaching of an ytterbium-doped silica double-clad LMA fiber", OPTICS EXPRESS, Vol. 15, No. 4, pp. 1606-1611 (2007)

SUMMARY OF INVENTION

Technical Problem

The above-described photodarkening phenomenon in the fiber optical device has been gradually understood qualitatively, and thus in order for the photodarkening to be overcome, attempts are being made to improve the glass composition of an amplification optical fiber, a core-clad structure or the like. Further, it has been reported that, in order to prevent the light transmission loss caused by photodarkening from being increased, the supply of ultraviolet laser light to the amplification optical fiber restores the characteristics of the optical fiber to the characteristics before the photodarkening. This restoration phenomenon of the characteristics is called photobleaching. In Non Patent Document 1, a photobleaching phenomenon produced by using a 355 nm wavelength third harmonic of an Nd:YAG laser is specifically disclosed.

Moreover, it has been reported with regard to the photobleaching phenomenon that laser light (for example, 407 nm wavelength laser light) emitted from a low-output blue LD was supplied as bleaching light to an amplification optical fiber, and thus the restoration of the characteristics was achieved by photobleaching. The capability of restoring characteristics of the optical fiber subjected to photodarkening by using a blue LD with output of about tens of mW as described above has a great impact on an practical use of a pulse oscillation type fiber laser device. However, sufficient studies have not been conducted on the specific method of applying the photobleaching phenomenon to the fiber optical devices.

The present invention has been made to solve the above problem, and has an object to provide a fiber optical device that can suitably restore the characteristics of an amplification optical fiber by photobleaching and a method of driving such a fiber optical device.

Solution to Problem

In order to achieve the above object, a fiber optical device according to the present invention includes: (1) an amplification optical fiber that includes a core containing a laser active substance; (2) a seed light source for supplying pulse seed light to the amplification optical fiber; (3) an excitation light source for supplying excitation light for the laser active substance to the amplification optical fiber; (4) a bleaching light source for supplying, to the amplification optical fiber, bleaching light for reducing a light transmission loss caused by photodarkening; and (5) control means that controls mutual timing of the supply of the pulse seed light from the seed light source to the amplification optical fiber, the supply of the excitation light from the excitation light source, and the supply of the bleaching light from the bleaching light source, and (6) the pulse seed light is supplied to the amplification optical fiber that is brought into a population inversion state by the supply of the excitation light such that an output light pulse resulting from the amplification of the pulse seed light is generated and output, and (7) the control means divides a period between a first output light pulse and a succeeding second output light pulse into a plurality of periods including at least a first period which includes a time point immediately after an output of the first output light pulse and during which the population inversion in the amplification optical fiber is unsaturated and a second period which includes a time point immediately before an output of the second output light pulse, supplies the bleaching light from the bleaching light source to the amplification optical fiber in the first period, and supplies the excitation light from the excitation light source in the second period.

A method of driving a fiber optical device according to the present invention can be applied to the fiber optical device including: (a) an amplification optical fiber that includes a core containing a laser active substance; (b) a seed light source for supplying pulse seed light to the amplification optical fiber; (c) an excitation light source for supplying excitation light for the laser active substance to the amplification optical fiber; and (d) a bleaching light source for supplying, to the amplification optical fiber, bleaching light for reducing a light transmission loss caused by photodarkening, and the method includes: (e) an output step of supplying the pulse seed light to the amplification optical fiber that is brought into a population inversion state by the supply of the excitation light such that an output light pulse resulting from the amplification of the pulse seed light is generated and output, (f) a bleaching step of supplying the bleaching light from the bleaching light source to the amplification optical fiber in a first period which includes a time point immediately after an output of a first output light pulse and during which the population inversion in the amplification optical fiber is unsaturated, and (g) an excitation step of supplying the excitation light from the excitation light source to the amplification optical fiber in a second period which includes a time point immediately before an output of a second output light pulse succeeding the first output light pulse.

In the above-described fiber optical device and the method of driving it, the bleaching light source for supplying the bleaching light to the optical fiber is provided in the fiber optical device that includes the amplification optical fiber, the seed light source, and the excitation light source. Thus, it is possible to reduce, by photobleaching phenomenon, the light transmission loss caused by the photodarkening in the amplification optical fiber to restore the characteristics of the optical fiber.

Further, with respect to the restoration of the characteristics of the optical fiber by the bleaching light, the period between the successive first and second output light pulses is divided into the first period and the second period, and, in the first period which includes a time point immediately after the output of the first output light pulse and during which the population inversion in the optical fiber is unsaturated, the bleaching light is supplied to the optical fiber to restore the characteristics of the optical fiber.

Here, the inventors of this application have thoroughly studied the restoration of the characteristics of the optical fiber by the photobleaching, and found that, when both the excitation light and the bleaching light are continuously supplied to the amplification optical fiber, the photodarkening rapidly progressed. By contrast, as described above, in the first period during which the population inversion in the optical fiber is unsaturated, the bleaching light is supplied, and thus it is possible to suitably restore the characteristics of the amplification optical fiber by the photobleaching.

ADVANTAGEOUS EFFECTS OF INVENTION

According to the fiber optical device and the method of driving it according to the present invention, the bleaching light source for supplying the bleaching light to the optical fiber is provided in the fiber optical device that includes the amplification optical fiber, the seed light source, and the excitation light source, and the period between the successive first and second output light pulses is divided into the first period and the second period, and, in the first period which includes a time point immediately after the output of the first output light pulse and during which the population inversion in the optical fiber is unsaturated, the bleaching light is supplied to the optical fiber to restore the characteristics of the optical fiber, and thus it is possible to suitably restore the characteristics of the amplification optical fiber by the photobleaching.

DESCRIPTION OF EMBODIMENTS

Figure 1:
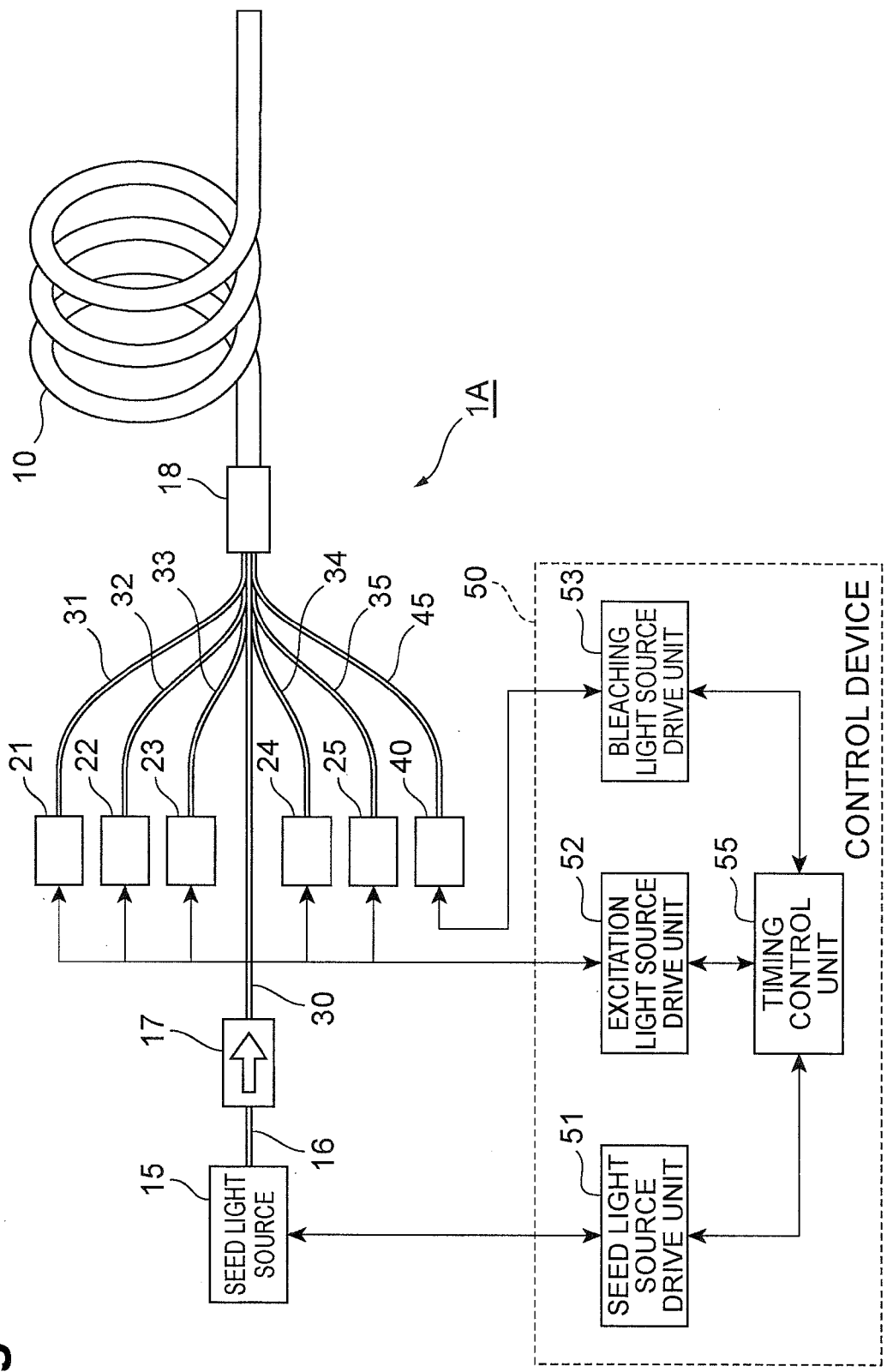
FIG. 1 is a diagram showing a configuration of an embodiment of a fiber optical device.

Preferred embodiments of a fiber optical device of the present invention and a method of driving such a fiber optical device will be described in detail below with reference to the accompanying drawings. In the description of the drawings, the same elements will be denoted by the same reference symbols, and overlapping description will be omitted. The dimensional ratios in the drawings do not always agree with those in the description.

FIG. 1 is a diagram showing a configuration of an embodiment of a fiber optical device of the present invention. The fiber optical device 1A of this embodiment is provided with an amplification optical fiber 10, a seed light source 15, excitation light sources 21 to 25, and a bleaching light source 40, and serves as a light source device that amplifies pulse seed light supplied from the seed light source 15 in the amplification optical fiber 10 and that outputs the amplified light as an output light pulse.

The amplification optical fiber 10 includes a core containing a laser active substance and a clad provided around the core, and is an optical fiber having the function of optical amplification. In this amplification optical fiber 10, excitation light of a wavelength that can excite the laser active material added thereto is supplied, and thus it is possible to optically amplify seed light of a wavelength included in a wavelength band having a gain. As this type of optical fiber 10, for example, an optical fiber can be used to which a rare earth element such as Yb or Er is added as the laser active substance and which is composed of silica glass. With respect to the specific configuration of the optical fiber 10, for example, an optical fiber of a double clad structure in which an inner clad and an outer clad are provided around the core can be used.

The seed light source 15 is a pulse light source that supplies pulse seed light serving as light to be amplified to the amplification optical fiber 10. As this type of seed light source 15, a pulse laser light source is preferably used that can supply pulse light having a predetermined wavelength and pulse width. The pulse seed light emitted from the seed light source 15 enters an optical fiber 16 through a condenser optical system such as a condenser lens, and is guided to a polarization independent optical isolator 17 by the optical fiber 16. Then, this pulse seed light is guided to an optical combiner 18 via the optical isolator 17 and an optical fiber 30. As the optical fibers 16 and 30, for example, single mode fibers (SMF) can be respectively used.

For the amplification optical fiber 10, one or more excitation light sources for supplying excitation light to the laser active substance contained in the core of the optical fiber 10 are provided. In the configuration example shown in FIG. 1, five excitation light sources 21 to 25 are arranged. As these excitation light sources 21 to 25, laser diodes (LD) are preferably used. The excitation light components having a predetermined wavelength that are emitted from the excitation light sources 21 to 25 are guided respectively by optical fibers 31 to 35 to the optical combiner 18. As these optical fibers 31 to 35, for example, multi mode fibers (MMF) can be used.

In the fiber optical device 1A of this embodiment, in addition to the excitation light sources 21 to 25, the bleaching light source 40 is further provided. This light source 40 is a bleaching light source that supplies bleaching light for reducing a light transmission loss due to characteristic deterioration by photodarkening to the amplification optical fiber 10. As this bleaching light source 40, a laser diode (LD) such as a blue laser diode is preferably used. As the bleaching light, light having a wavelength ranging from 355 nm to 532 nm is preferably used. The bleaching light of a predetermined wavelength emitted from the light source 40 is guided by an optical fiber 45 to the optical combiner 18. As the optical fiber 45, as in the optical fibers 31 to 35, for example, a multi mode fiber (MMF) can be used.

To the input side of the optical combiner 18 are connected a total of seven optical fibers, specifically, one optical fiber 30 preferably composed of the SMF and six optical fibers 31 to 35 and 45 preferably composed of the MMFs. To the output side of the optical combiner 18 is connected the input end of the amplification optical fiber 10 having the core containing the laser active substance. Thus, the pulse seed light from the seed light source 15, the excitation light from the excitation light sources 21 to 25, and the bleaching light from the bleaching light source 40 are supplied to the amplification optical fiber 10 respectively via the corresponding optical fibers 30, 31 to 35, and 45, and the optical combiner 18.

In the configuration described above, the pulse seed light from the seed light source 15 is supplied to the amplification optical fiber 10 that is brought into a population inversion state by the supply of the excitation light from the excitation light sources 21 to 25. Here, the pulse seed light is optically amplified by the optical fiber 10, and an output light pulse that is the amplified light is generated and is output from the output end of the optical fiber 10 (output step). When the fiber optical device 1A shown in FIG. 1 is configured as a fiber laser device, a resonator is provided for the amplification optical fiber 10, and the amplified light pulse performs lasing within the resonator to generate a laser light pulse that is an output light pulse. In this case, the resonator can be configured by using, for example, an end surface of the optical fiber 10, a fiber grating formed in the optical fiber 10, or the like. When the fiber optical device 1A is configured as a fiber optical amplification device, a resonator structure is not needed.

There is provided a control device 50 that controls the operation of the amplification optical fiber 10, the seed light source 15, the excitation light sources 21 to 25, and the bleaching light source 40. This control device 50 is control means for controlling the mutual timing of the supply of the pulse seed light from the seed light source 15 to the amplification optical fiber 10, the supply of the excitation light from the excitation light sources 21 to 25, and the supply of the bleaching light from the bleaching light source 40.

The control device 50 is provided with a seed light source drive unit 51, an excitation light source drive unit 52, a bleaching light source drive unit 53, and a timing control unit 55. The light source drive units 51 to 53 are configured by using, for example, light source drive circuits, and respectively drive and control the corresponding seed light source 15, the excitation light sources 21 to 25, and the bleaching light source 40. The timing control unit 55 is configured by using, for example, a timing control circuit, and gives instructions on drive timings respectively to the light source drive units 51 to 53 to control the supply timings of the light components from the light sources. Here, the timing of the supply of the pulse seed light from the seed light source 15 corresponds to the timing of the output of the output light pulse from the amplification optical fiber 10.

In the fiber optical device 1A of the present embodiment, with respect to a pulse train of output light pulses output as time series pulses from the amplification optical fiber 10, the control device 50 divides a period between a first output light pulse and the succeeding second output light pulse into a plurality of periods having at least a first period which includes a time point immediately after the output of the first output light pulse and during which the population inversion in the amplification optical fiber 10 is unsaturated, and a second period which includes a time point immediately before the output of the second output light pulse. Then, in the first period, the bleaching light from the bleaching light source 40 is supplied (a bleaching step) to the amplification optical fiber 10 to restore the characteristics of the optical fiber 10, and in the second period, the excitation light from the excitation light sources 21 to 25 is supplied (an excitation step) to the amplification optical fiber to excite the laser active substance in the optical fiber 10.

The effects of the fiber optical device 1A and the method of driving the fiber optical device according to the present embodiment will be described.

In the fiber optical device 1A shown in FIG. 1 and the method of driving it, the bleaching light source 40 for supplying the bleaching light to the optical fiber 10 is provided for the fiber optical device 1A, which includes the amplification optical fiber 10, the seed light source 15, and the excitation light sources 21 to 25. Thus, it is possible to reduce the light transmission loss caused by the photodarkening in the amplification optical fiber 10, by the photobleaching phenomenon, to restore the characteristics of the optical fiber 10.

Further, with respect to the restoration of the characteristics of the optical fiber 10 by the bleaching light, for the pulse train of the output light pulses from the optical fiber 10, the period between the successive first and second output light pulses is divided into the first period and the second period. Then, in the first period which includes a time point immediately after the output of the first output light pulse and during which the population inversion in the optical fiber is unsaturated, the bleaching light is supplied to the amplification optical fiber 10 to restore the characteristics of the optical fiber 10.

Here, on the restoration of the characteristics of the optical fiber by the photobleaching in the fiber laser device, the inventors of this application performed an experiment for operating the pulse oscillation type laser device and simultaneously supplying the bleaching light to reduce the progress of the photodarkening, and found that, on the contrary in the result of the experiment, as compared with the case where the excitation light is only supplied to the amplification optical fiber, the photodarkening progressed rapidly and the amplification optical fiber was broken. This is probably because the bleaching light is supplied to the amplification optical fiber in which the population inversion density is high by the supply of the excitation light. In addition, in the continuous oscillation type fiber laser device, since the population inversion density is kept low, the characteristics of the optical fiber are not degraded due to photodarkening. It is generally said that the progress of the photodarkening is proportional to the square of the population inversion.

Based on these findings, in the fiber optical device 1A of the embodiment described above, a period during which, after the output of the output light pulse, the population inversion in the amplification optical fiber 10 is unsaturated and the population inversion density is sufficiently low is set as the first period, and in the first period, the bleaching light is supplied from the light source 40 to the optical fiber 10. Thus, it is possible to restore the characteristics of the amplification optical fiber 10 by the photobleaching and suitably reduce the light transmission loss. The setting of the period in which the bleaching light is supplied to the amplification optical fiber 10 will be further described specifically later.

Specifically, for example, the bleaching light supplied from the bleaching light source 40 to the amplification optical fiber 10 preferably has a wavelength ranging from 355 nm to 532 nm. By using the bleaching light of such a wavelength, it is possible to suitably restore the characteristics of the optical fiber.

The above-described range of the wavelength of the bleaching light indicates a wavelength range that is set in consideration of the practical wavelength range of a light source that can be suitably introduced into the optical fiber. Specifically, the wavelength of 355 nm indicates the wavelength of a third harmonic of a YAG laser. Further, The wavelength of 532 nm indicates the wavelength of a second harmonic of the YAG laser. In addition, the light of a particularly important wavelength range within the above-mentioned wavelength range can also be supplied by the laser diode (LD). Examples of such bleaching light can include light of a wavelength of 407 nm supplied from a blue LD.

With respect to the active material used to amplify the pulse seed light, as the laser active substance contained in the core of the amplification optical fiber 10, Yb (ytterbium) is preferable. Thus, it is possible to suitably configure the amplification optical fiber 10.

With respect to the supply of the excitation light to the amplification optical fiber 10, in an entire period including the first period and the second period, the excitation light may be supplied from the excitation light sources 21 to 25 to the amplification optical fiber 10. In this case, in consideration of variations with time in the population inversion density in the amplification optical fiber 10 by the supply of the excitation light, as described above, it is necessary to set the first period to supply the bleaching light at the period during which the population inversion is unsaturated. Alternatively, with respect to the supply of the excitation light, no excitation light may be supplied during the first period. In this case, in the first period, the population inversion in the amplification optical fiber is reliably kept unsaturated.

In the fiber optical device 1A, the pulse train of the output light pulses output from the amplification optical fiber 10 may include a first pulse group including a plurality of output light pulses in which the above-mentioned first output light pulse is a last output light pulse, and a second pulse group including a plurality of output light pulses in which the second output light pulse is an initial output light pulse, and the time interval between the first output light pulse and the second output light pulse may be set longer than the time interval between the output light pulses in the first pulse group and the second pulse group.

In this case, it is preferable that, in the first pulse group and the second pulse group, the bleaching light is not supplied in periods between the output light pulses, and, in the first period set between the first output light pulse and the second output light pulse (between the first pulse group and the second pulse group), the bleaching light is supplied from the light source 40 to the amplification optical fiber 10. This configuration is effective such as when, for example, in an industrial fiber laser device, while the laser device is stopped, the bleaching light is supplied to restore the characteristics of the optical fiber.

A description will be given of an example of the specific configuration of the fiber optical device 1A shown in FIG. 1. In this configuration example, as the amplification optical fiber 10, an Yb-doped optical fiber manufactured by Nufern was used. This optical fiber 10 is a double-clad type optical fiber, and has a core diameter of about 10 μm and an inner clad diameter of about 130 μm. The Yb-doped optical fiber 10 is about 8 meters in length, and an end cap with oblique polish finishing (about 8 degrees) is adhered to the output end of the optical fiber such that parasitic oscillation is unlikely to occur.

As the pulse seed light source 15, an LD excitation Q-switch type laser oscillator using Nd: YAG as a laser medium manufactured by Hamamatsu Photonics K.K. was used. The oscillator has a laser wavelength of about 1064 nm and a linewidth of about 2 nm. The pulse repetition frequency varies from 1 Hz to 50 kHz.

The pulse width of the pulse seed light supplied from the seed light source 15 depends on the excitation intensity and the repetition frequency. In an example which will be described later, the pulse width is set at, for example, about 250 ns (full width at half maximum). The pulse energy, similar to the pulse width, depends on the excitation intensity and the repetition frequency. In the example, the pulse energy is set at, for example, about 230 nJ. As the optical fiber 16, which guides the pulse seed light, a single mode fiber HI1060 manufactured by Corning was used. The pulse energy of the pulse seed light at the output end of the optical fiber 16 was about 110 nJ/pulse.

As the excitation light sources 21 to 25, fiber coupling type LDs manufactured by Hamamatsu Photonics K.K. were used. This LD has an output wavelength of about 915 nm and a maximum output of about 5 W. Here, the number of excitation light sources for the amplification optical fiber 10 may be freely set according to the specific configuration of the fiber optical device 1A, and, in this case, the number is set at five.

As the bleaching light source 40, a blue LD manufactured by Nichia Corporation was used. This LD has an output wavelength of 407 nm. The coupling between the blue LD and the optical fiber 45 was performed using a condenser lens. The output of the bleaching light at the output end of the optical fiber 45 was about 80 mW at maximum. The output and timing of the pulse seed light, the excitation light, and the bleaching light are freely controllable.

As the optical combiner 18, a combiner manufactured by ITF was used. This combiner is provided with, on the input side, six multi-mode fibers (MMFs with a core diameter of about 105 μm and a clad diameter of about 125 μm) for the introduction of excitation light, and one single-mode fiber (SMF) for the introduction of signal light (seed light), and these six MMFs and one SMF are connected to a double clad type SMF (with a core diameter of about 6 μm, an inner clad diameter of about 125 μm and an outer clad diameter of about 300 μm) on the output side. The amplification optical fiber 10 described above is further connected to the output side double clad type SMF.

In this configuration example, as the optical fibers 31 to 35 and 45 connected to the excitation light sources 21 to 25 and the bleaching light source 40, the six MMFs on the input side of the above-described combiner were used. In addition, as the optical fiber 30 connected to the seed light source 15 via the optical isolator 17, the one SMF on the input side of the combiner was used.

A further description will be given of the fiber optical device and the method of driving it according to the present invention, with specific operation examples. In the following description, a case where the fiber optical device is used as the laser device will be described, however, the basic operation is the same as a case where the fiber optical device is used as the optical amplification device.

Figure 2:
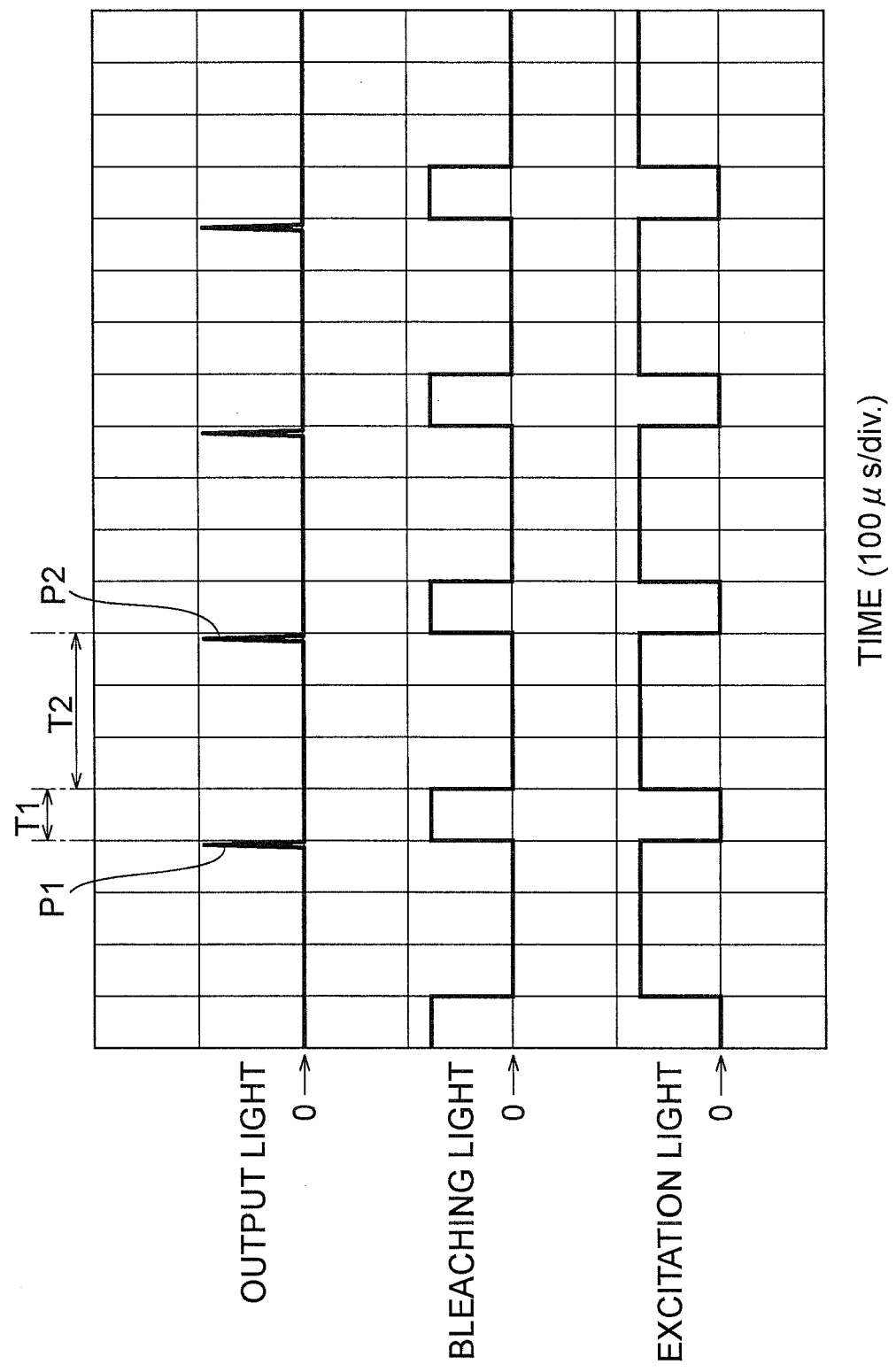
FIG. 2 is a timing chart showing a first example of the operation of the fiber laser device.

FIG. 2 is a timing chart showing a first example of the operation of the fiber laser device shown in FIG. 1. Here, the supply timings of the excitation light and the bleaching light to the amplification optical fiber 10 and the output timing of the output light pulse from the amplification optical fiber 10 are shown. In the timing chart shown in FIG. 2, the horizontal axis represents time (100 µs/div). In this operation example, the repetition frequency of the output laser light pulse is set at 2.5 kHz, the pulse energy is set at 2 mJ, the pulse width (FWHM) is set at 250 ns, the supply pulse width of the bleaching light is set at 100 µs, and the supply pulse width of the excitation light is set at 300 µs.

Figure 3:
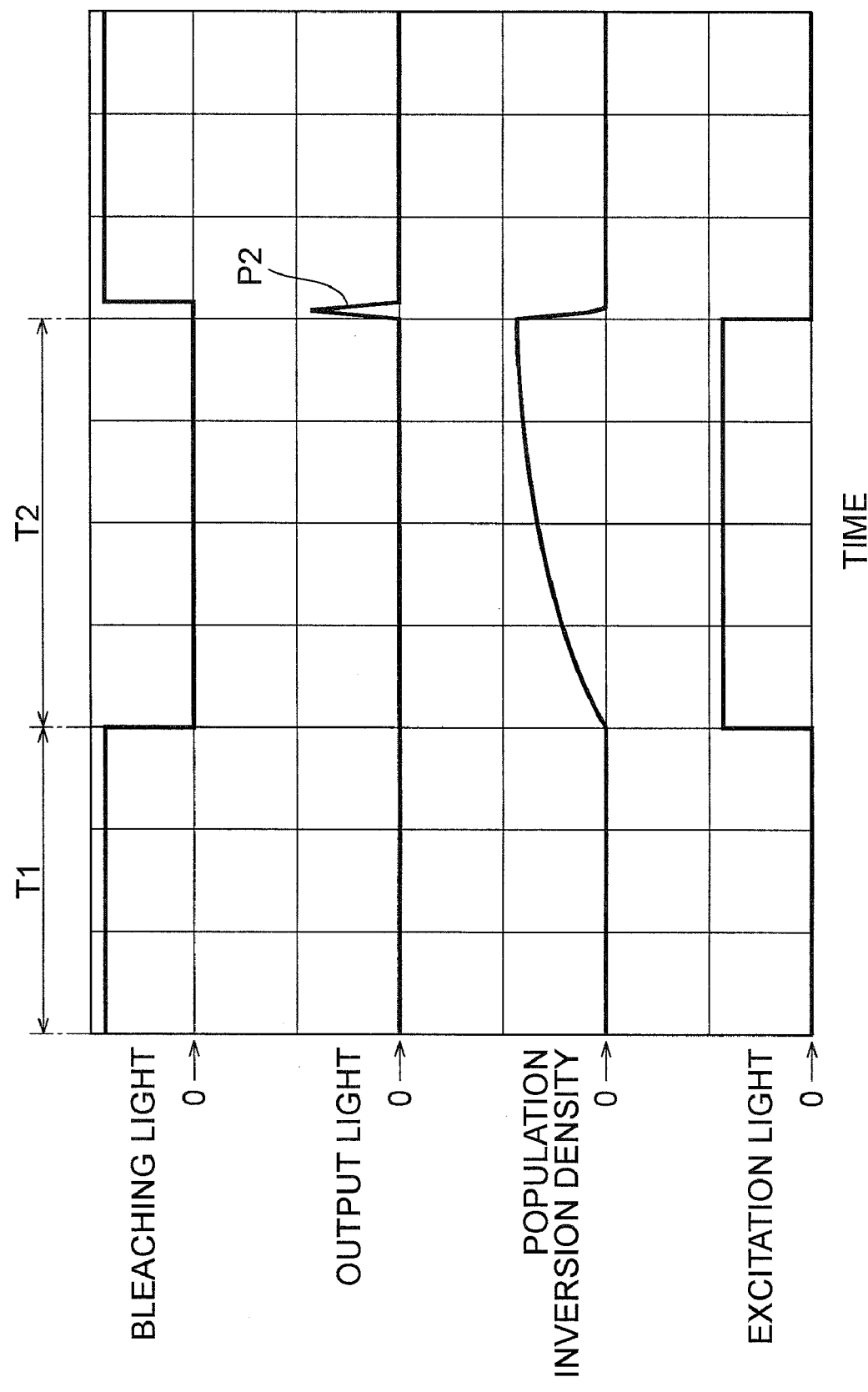
FIG. 3 is a timing chart showing supply timings of excitation light and bleaching light, an output timing of an output light pulse, and a variation of a population inversion density with time.

FIG. 3 is a timing chart showing, for the operation example shown in FIG. 2, the supply timings of the excitation light and the bleaching light, the output timing of the output light pulse, and the variation of the population inversion density in the amplification optical fiber 10 with time. FIG. 3 is used to show the relationship between operation periods and variations with time in the population inversion density, and thus the conditions of the pulse width and the like of the excitation light and the bleaching light are different from those in the timing chart of FIG. 2.

In the operation example shown in FIG. 2 and FIG. 3, a period of time between a first output light pulse P1 and a succeeding second output light pulse P2 is divided into a first period T1 which includes a time point immediately after the output of the output light pulse P1 and during which the population inversion in the amplification optical fiber 10 is unsaturated, and a second period T2 which includes a time point immediately before the output of the output light pulse P2. Then, during the first period T1 in which the population inversion is unsaturated, the bleaching light is supplied to the amplification optical fiber 10. Further, during the second period T2, the excitation light is supplied to the amplification optical fiber 10, and the supply timing of the light is set such that, when the supply of the excitation light is completed, the pulse seed light is supplied to the optical fiber 10 to generate the output light pulse.

Figure 4:
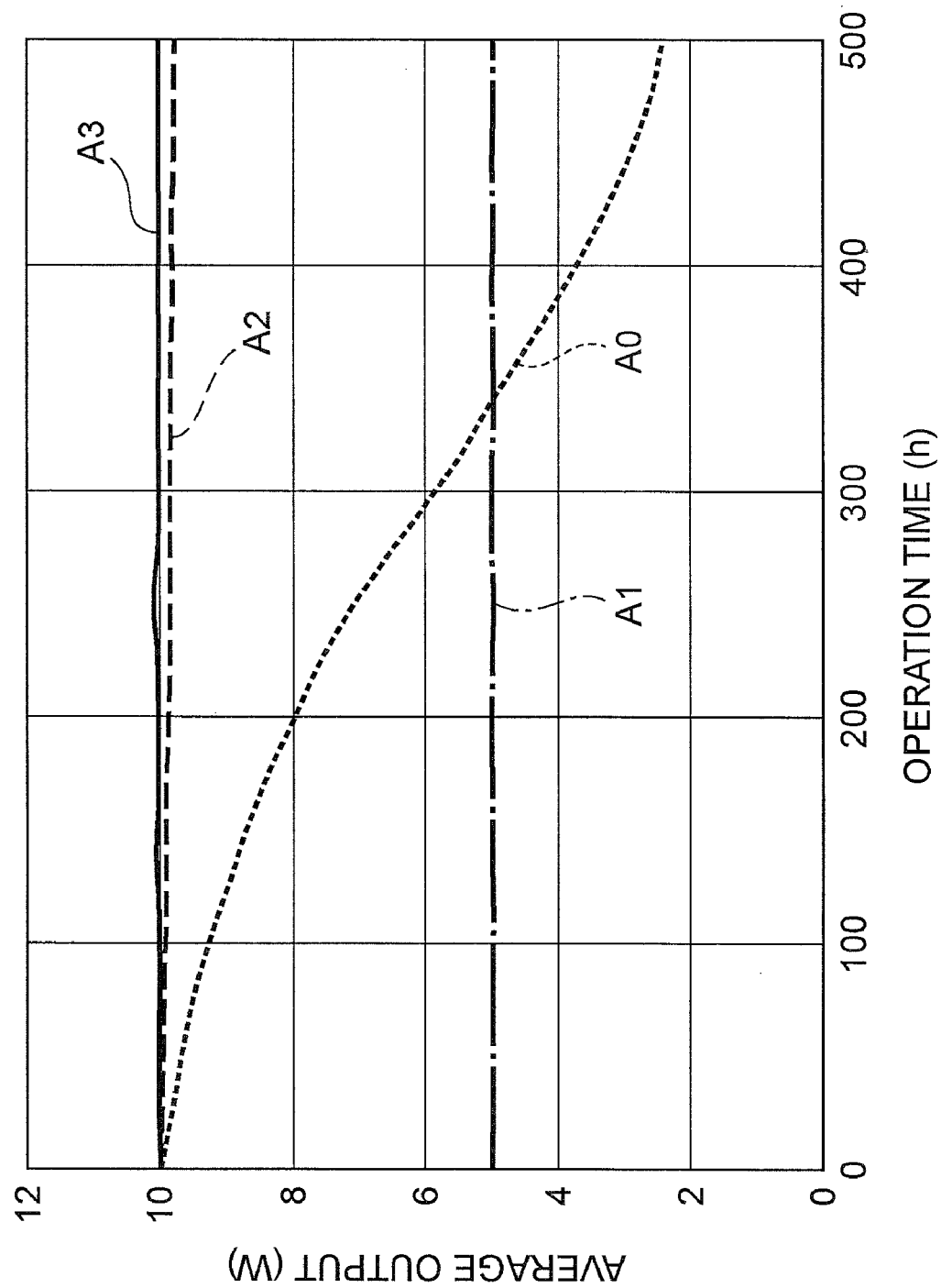
FIG. 4 is a graph showing variations with time in the average output of the fiber laser device.

FIG. 4 is a graph showing variations with time in the average output of the fiber laser device, where the horizontal axis represents the operation time (h) and the vertical axis represents the average output (W). In the graph shown in FIG. 4, a graph A0 represents variations with time in output when the bleaching light is not supplied to the amplification optical fiber 10, and a graph A1 represents variations with time in output in the first operation example shown in FIG. 2. A graph A2 represents variations with time in output in a second operation example, which will be described later, and a graph A3 represents variations with time in output in a third operation example. The graph A0 represents variations with time in output when the bleaching light is not supplied in the third operation example.

The graph A0 of FIG. 4 shows that, when the bleaching light is not supplied to restore the characteristics of the amplification optical fiber 10, the laser output gradually decreases with time, and decreases to about 20% of the initial value in 500 hours. After the completion of the experiment, the Yb-doped optical fiber used as the optical fiber 10 was removed, and the light transmission loss was measured, with the result that increased loss over a wide range from the visible range to the near-infrared range was found. This is typical of the photodarkening phenomenon.

On the other hand, when the bleaching light is supplied in the operation example shown in FIG. 2, as shown in the graph A1, a decrease in output was not found in the operation time of 500 hours. This shows that, in the first period T1 (see FIG. 3), from a time point immediately after the extraction of the population inversion in the amplification optical fiber 10 as energy by the output light pulse, to a start point of the succeeding supply of the excitation light, in which the population inversion density is sufficiently low, the bleaching light is supplied, and thus the characteristics of the amplification optical fiber 10 are restored. In this operation example, the repetition frequency is set low, and thus the average output value is relatively low.

Figure 5:
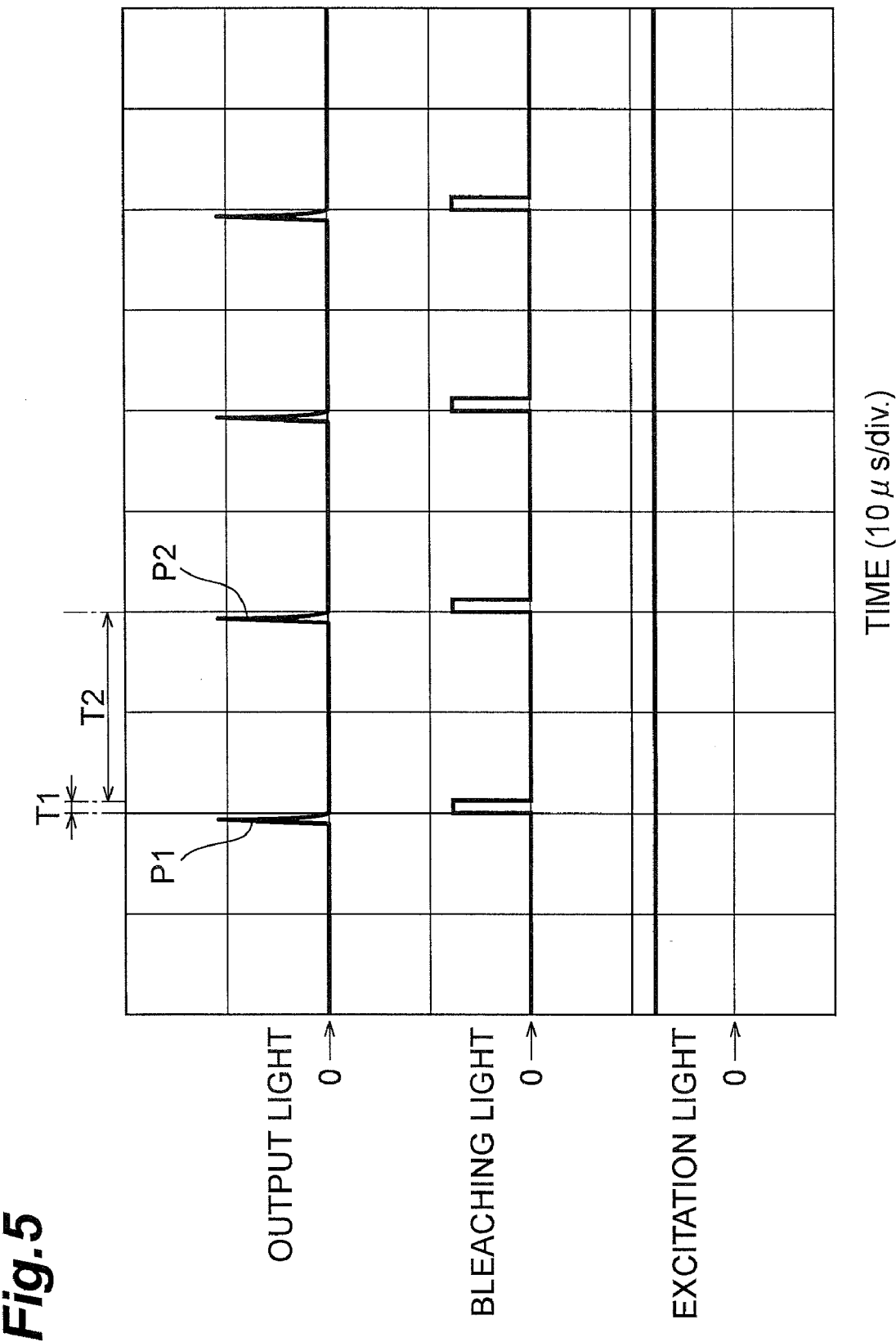
FIG. 5 is a timing chart showing a second example of the operation of the fiber laser device.

FIG. 5 is a timing chart showing a second example of the operation of the fiber laser device shown in FIG. 1. In the timing chart shown in FIG. 5, the horizontal axis represents time (10 µs/div). In this example, the repetition frequency of the output laser light pulse is set at 50 kHz, the pulse energy is set at 200 µJ, the pulse width (FWHM) is set at 250 ns, the supply pulse width of the bleaching light is set at 1000 ns (1 µs), and the excitation light is set such that it is supplied continuously.

Figure 6:
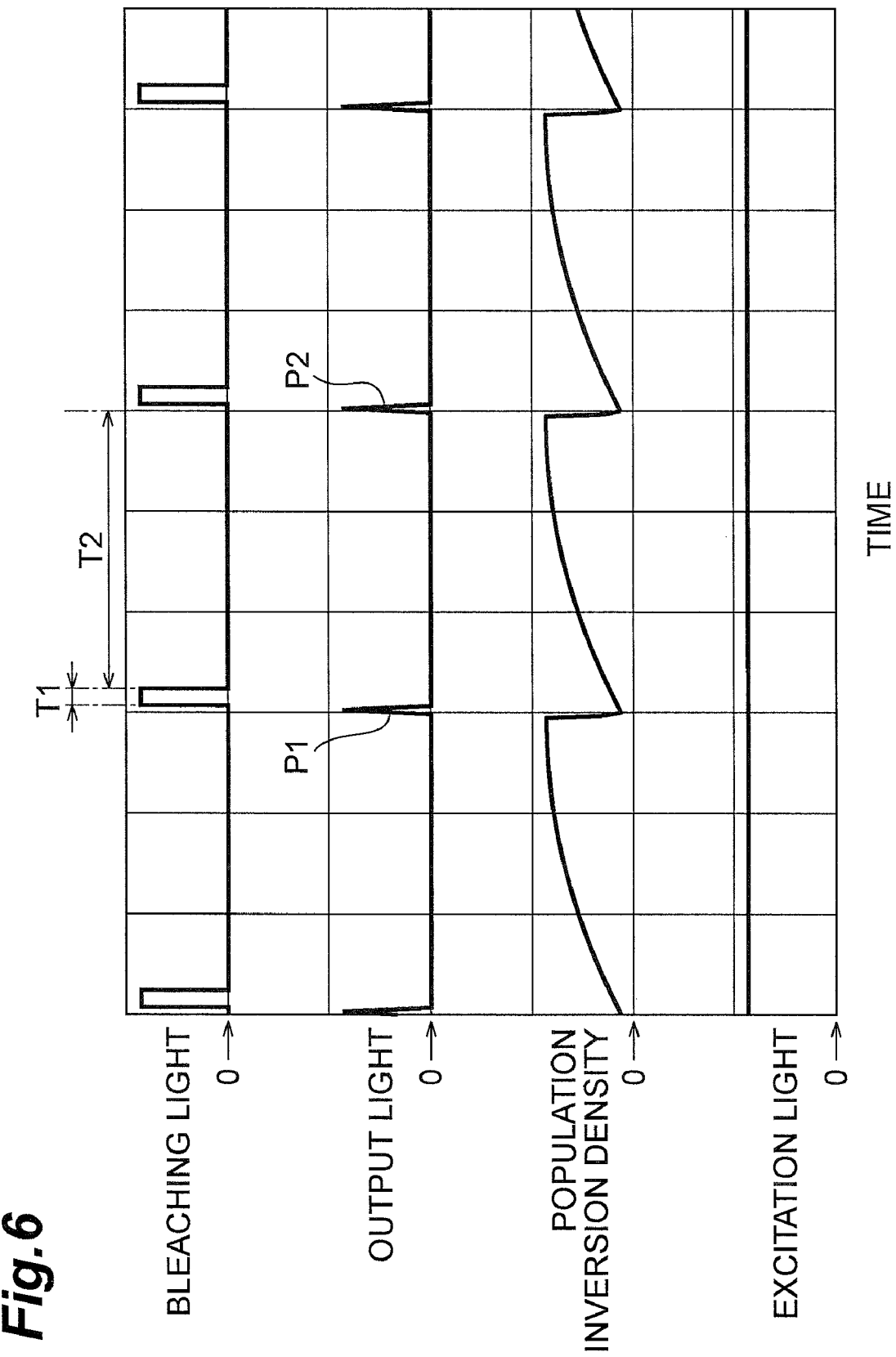
FIG. 6 is a timing chart showing supply timings of excitation light and bleaching light, an output timing of an output light pulse, and a variation of a population inversion density with time.

FIG. 6 is a timing chart showing, for the operation example shown in FIG. 5, the supply timings of the excitation light and the bleaching light, the output timing of the output light pulse, and the variation of the population inversion density in the amplification optical fiber 10 with time.

In the operation example shown in FIG. 5 and FIG. 6, a period of time between the first output light pulse P1 and the succeeding second output light pulse P2 is divided into the first period T1 which includes the time point immediately after the output of the output light pulse P1 and during which the population inversion in the amplification optical fiber 10 is unsaturated, and the second period T2 which includes the time point immediately before the output of the output light pulse P2. Then, during the first period T1 in which the population inversion is unsaturated, the bleaching light is supplied to the amplification optical fiber 10. Further, during the entire period including the first period T1 and the second period T2, the excitation light is continuously supplied to the amplification optical fiber 10.

In FIG. 4, the graph A2 shows variations with time in output in the second operation example shown in FIG. 5. As shown in the graph A2, when the bleaching light is supplied in the operation example of FIG. 5, as in the operation example of FIG. 2, a decrease in output was not found in the operation time of 500 hours. This shows that, in the first period T1 (see FIG. 6), from a time point immediately after the extraction of the population inversion in the amplification optical fiber 10 as energy by the output light pulse, in which the population inversion density being increased by the supply of the excitation light is kept sufficiently low, the bleaching light is supplied, and thus, although the excitation light is continuously supplied to the amplification optical fiber 10, the characteristics of the amplification optical fiber 10 are restored.

Figure 7:
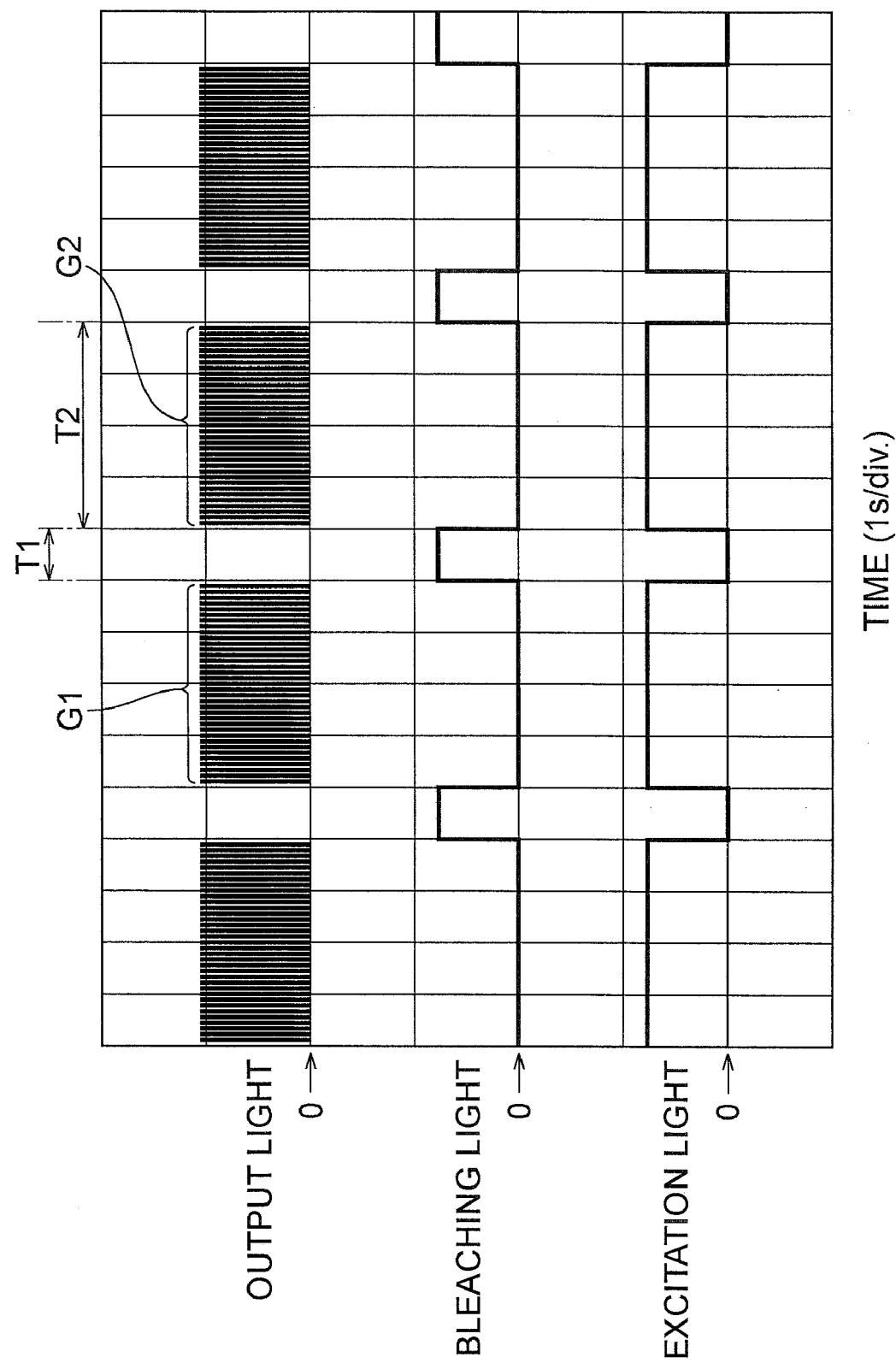
FIG. 7 is a timing chart showing a third example of the operation of the fiber laser device.

FIG. 7 is a timing chart showing a third example of the operation of the fiber laser device shown in FIG. 1. In the timing chart shown in FIG. 7, the horizontal axis represents time (1 s/div). In this example, the repetition frequency of the output laser light pulse is set at 50 kHz, the pulse energy is set at 200 µJ, and the pulse width (FWHM) is set at 250 ns. In addition, as to the outputs of the light pulses, two periods are alternately performed, specifically, a four-second operation period in which the light pulses are continuously output at regular intervals, and a one-second stop period in which the laser operation is stopped without the light pulses being output. Here, in the four-second operation period, a pulse train of the output light pulses output from the amplification optical fiber 10 is assumed to be the pulse group.

In the operation example shown in FIG. 7, a pulse group including a plurality of output light pulses in which the first output light pulse is a last output light pulse is assumed to be a first pulse group G1, and a succeeding pulse group including a plurality of output light pulses in which the second output light pulse is an initial output light pulse is assumed to be a second pulse group G2. Here, a time interval (1 s, corresponding to the stop period) between the first output light pulse and the second output light pulse is set longer than a time interval (20 μs) between the output light pulses in the first pulse group G1 and in the second pulse group G2.

In this configuration, in the operation example of FIG. 7, in the first pulse group G1 and the second pulse group G2, the bleaching light is not supplied in periods between the output light pulses, whereas, in the first period T1 set between the first output light pulse and the second output light pulse (between the first and second pulse groups), the bleaching light is supplied to the amplification optical fiber 10.

Namely, in this operation example, about a one-second period that includes a time point immediately after the output of the first output light pulse, which is the last output light pulse in the first pulse group G1, and that spans over almost the entire period of the laser light source stop period is set to be the first period T1. Moreover, about a four-second period that includes a predetermined time period immediately before the output of the second output light pulse, which is the earliest output light pulse in the second pulse group G2, and that also includes the laser light source operation period in which the output light pulses in the second pulse group G2 are output is set to be the second period T2. Then, during the first period T1 in which the population inversion is unsaturated, the bleaching light is supplied to the amplification optical fiber 10. Further, during the second period T2, the excitation light is continuously supplied to the amplification optical fiber 10.

In FIG. 4, the graph A3 shows variations with time in output in the third operation example shown in FIG. 7. As shown in the graph A3, when the bleaching light is supplied in the operation example of FIG. 7, as in the operation example of FIG. 2 and the operation example of FIG. 5, a decrease in output was not found in the operation time of 500 hours. This shows that, in the first period T1 set within the laser device stop period, the bleaching light is supplied, and thus the characteristics of the amplification optical fiber 10 are restored.

In this operation example, the output of the excitation light is about 15 W, and the output of the bleaching light is about 50 mW. The laser output shown in the graph A3 of FIG. 4 was obtained by only sampling the output of the fiber laser device in operation. As described above, the graph A0 of FIG. 4 shows variations with time in output when the bleaching light is not supplied on operation conditions in the third operation example.

When the fiber laser device is used as an industrial laser device, it is often required to operate the laser device for twenty-four hours to enhance productivity. However, even in this case, it is necessary to take time to replace an item to be subjected to laser processing and to perform the positioning, and, during such time periods, the laser device is stopped. During these laser device stop periods, for example, the operation example shown in FIG. 7 is effective in supplying the bleaching light to restore the characteristics of the amplification optical fiber 10.

The fiber optical device and the method of driving it according to the present invention are not limited to the embodiment and the configuration examples described above, and can be modified in many ways. For example, the configuration shown in FIG. 1 is an example of the specific configuration of the fiber optical device, and other configurations are possible. For example, although, in the configuration of FIG. 1, the excitation light and the bleaching light are supplied to the amplification optical fiber from the side of the input end of the optical fiber as in the pulse seed light, the excitation light and the bleaching light may be supplied either from the side of the output end of the optical fiber or from both sides of the input and output ends thereof.

With respect to the first period during which the bleaching light is supplied to the amplification optical fiber, the bleaching light supply period can be set as appropriate according to the specific configuration, the operation conditions and the like of the fiber optical device other than the above-described first to third operation examples, such that conditions for the period which includes a time point immediately after the output of the first output light pulse and during which the population inversion in the amplification optical fiber is unsaturated are satisfied.

Here, the fiber optical device according to the above-described embodiment includes: (1) an amplification optical fiber that includes a core containing a laser active substance; (2) a seed light source that supplies pulse seed light to the amplification optical fiber; (3) an excitation light source that supplies excitation light for the laser active substance to the amplification optical fiber; (4) a bleaching light source that supplies, to the amplification optical fiber, bleaching light for reducing a light transmission loss caused by photodarkening; and (5) control means that controls mutual timing of the supply of the pulse seed light from the seed light source to the amplification optical fiber, the supply of the excitation light from the excitation light source, and the supply of the bleaching light from the bleaching light source, and (6) the pulse seed light is supplied to the amplification optical fiber that is brought into a population inversion state by the supply of the excitation light such that an output light pulse resulting from the amplification of the pulse seed light is generated and output, and (7) the control means divides a period between a first output light pulse and a succeeding second output light pulse into a plurality of periods including at least a first period which includes a time point immediately after an output of the first output light pulse and during which the population inversion in the amplification optical fiber is unsaturated, and a second period which includes a time point immediately before an output of the second output light pulse, supplies the bleaching light from the bleaching light source to the amplification optical fiber during the first period, and supplies the excitation light from the excitation light source during the second period.

The method of driving a fiber optical device according to the above-described embodiment can be applied to the fiber optical device including: (a) an amplification optical fiber that includes a core containing a laser active substance; (b) a seed light source that supplies pulse seed light to the amplification optical fiber; (c) an excitation light source that supplies excitation light for the laser active substance to the amplification optical fiber; and (d) a bleaching light source that supplies, to the amplification optical fiber, bleaching light for reducing a light transmission loss caused by photodarkening, and the method includes: (e) an output step of supplying the pulse seed light to the amplification optical fiber that is brought into a population inversion state by the supply of the excitation light such that an output light pulse resulting from the amplification of the pulse seed light is generated and output, (f) a bleaching step of supplying the bleaching light from the bleaching light source to the amplification optical fiber during a first period which includes a time point immediately after an output of a first output light pulse and during which the population inversion in the amplification optical fiber is unsaturated, and (g) an excitation step of supplying the excitation light from the excitation light source to the amplification optical fiber during a second period which includes a time point immediately before an output of a second output light pulse succeeding the first output light pulse.

With respect to the bleaching light supplied to the amplification optical fiber to restore the characteristics by photobleaching, the bleaching light supplied from the bleaching light source is preferably light that has a wavelength ranging from 355 nm to 532 nm. By using the light of such a wavelength as the bleaching light, it is possible to suitably restore the characteristics of the optical fiber.

With respect to the active substance used to amplify the pulse seed light, the laser active substance contained in the core of the amplification optical fiber is preferably Yb (ytterbium). Thus, it is possible to suitably configure the amplification optical fiber.

With respect to the supply of the excitation light to the amplification optical fiber, during an entire period including the first period and the second period, the excitation light from the excitation light source may be supplied to the amplification optical fiber. Alternatively, with respect to the supply of the excitation light, during the first period, no excitation light may be supplied.

A pulse train of the output light pulses output from the amplification optical fiber may include a first pulse group including a plurality of output light pulses in which the first output light pulse is a last output light pulse and a second pulse group including a plurality of output light pulses in which the second output light pulse is a first output light pulse, a time interval between the first output light pulse and the second output light pulse may be set longer than a time interval between output light pulses in the first pulse group and the second pulse group, and in the first pulse group and the second pulse group, the bleaching light may not be supplied between output light pulses, and, during the first period set between the first output light pulse and the second output light pulse, the bleaching light from the bleaching light source may be supplied to the amplification optical fiber. This configuration is effective when, for example, in an industrial fiber laser device, in the laser device stop period, the characteristics of the optical fiber are restored by the supply of the bleaching light.

Industrial Applicability

The present invention can be applied to a fiber optical device that can suitably restore the characteristics of an amplification optical fiber by photobleaching and a method of driving it.

Reference Signs List

1A—Fiber optical device, 10—Amplification optical fiber, 15—Pulse seed light source, 16—Optical fiber, 17—Optical isolator, 18—Optical combiner, 21 to 25—Excitation light sources, 30—Optical fiber, 31 to 35—Optical fibers, 40—Bleaching light source, 45—Optical fiber, 50—Control device, 51—Seed light source drive unit, 52—Excitation light source drive unit, 53—Bleaching light source drive unit, 55—Timing control unit.

The invention claimed is:

1. A fiber optical device comprising:
an amplification optical fiber that includes a core containing a laser active substance;
a seed light source for supplying pulse seed light to the amplification optical fiber;
an excitation light source for supplying excitation light for the laser active substance to the amplification optical fiber;
a bleaching light source for supplying, to the amplification optical fiber, bleaching light for reducing a light transmission loss caused by photodarkening; and
control means that controls mutual timing of the supply of the pulse seed light from the seed light source to the amplification optical fiber, the supply of the excitation light from the excitation light source, and the supply of the bleaching light from the bleaching light source,
wherein the pulse seed light is supplied to the amplification optical fiber that is brought into a population inversion state by the supply of the excitation light such that an output light pulse resulting from the amplification of the pulse seed light is generated and output, and
the control means
divides a period between a first output light pulse and a succeeding second output light pulse into a plurality of periods including a first period which includes a time point immediately after an output of the first output light pulse and during which the population inversion in the amplification optical fiber is unsaturated and a second period which includes a time point immediately before an output of the second output light pulse,
supplies the bleaching light from the bleaching light source to the amplification optical fiber in the first period, and supplies the excitation light from the excitation light source in the second period.

2. The fiber optical device according to claim 1, wherein the bleaching light supplied from the bleaching light source is light having a wavelength ranging from 355 nm to 532 nm.

3. The fiber optical device according to claim 1, wherein the laser active substance contained in the core of the amplification optical fiber is Yb.

4. The fiber optical device according to claim 1, wherein, during an entire period including the first period and the second period, the excitation light from the excitation light source is supplied to the amplification optical fiber.

5. The fiber optical device according to claim 1, wherein a pulse train of the output light pulses output from the amplification optical fiber includes a first pulse group including a plurality of output light pulses in which the first output light pulse is a last output light pulse and a second pulse group including a plurality of output light pulses in which the second output light pulse is an initial output light pulse,
a time interval between the first output light pulse and the second output light pulse is set longer than a time interval between output light pulses in the first pulse group and the second pulse group, and
in the first pulse group and the second pulse group, the bleaching light is not supplied between output light pulses, and, in the first period set between the first output light pulse and the second output light pulse, the bleaching light from the bleaching light source is supplied to the amplification optical fiber.

6. A method of driving a fiber optical device, the fiber optical device including:
an amplification optical fiber that includes a core containing a laser active substance;
a seed light source for supplying pulse seed light to the amplification optical fiber;
an excitation light source for supplying excitation light for the laser active substance to the amplification optical fiber; and
a bleaching light source for supplying, to the amplification optical fiber, bleaching light for reducing a light transmission loss caused by photodarkening,
the method comprising:
an output step of supplying the pulse seed light to the amplification optical fiber that is brought into a population inversion state by the supply of the excitation light such that an output light pulse resulting from the amplification of the pulse seed light is generated and output, a bleaching step of supplying the bleaching light from the bleaching light source to the amplification optical fiber in a first period which includes a time point immediately after an output of a first output light pulse and during which the population inversion in the amplification optical fiber is unsaturated, and an excitation step of supplying the excitation light from the excitation light source to the amplification optical fiber in a second period which includes a time point immediately before an output of a second output light pulse succeeding the first output light pulse.

7. The method of driving a fiber optical device according to claim 6, wherein the bleaching light supplied from the bleaching light source is light having a wavelength ranging from 355 nm to 532 nm.

8. The method of driving a fiber optical device according to claim 6, wherein the laser active substance contained in the core of the amplification optical fiber is Yb.

9. The method of driving a fiber optical device according to claim 6, wherein, during an entire period including the first period and the second period, the excitation light from the excitation light source is supplied to the amplification optical fiber.

10. The method of driving a fiber optical device according to claim 6, wherein a pulse train of the output light pulses output from the amplification optical fiber includes a first pulse group including a plurality of output light pulses in which the first output light pulse is a last output light pulse and a second pulse group including a plurality of output light pulses in which the second output light pulse is an initial output light pulse, a time interval between the first output light pulse and the second output light pulse is set longer than a time interval between output light pulses in the first pulse group and the second pulse group, and in the first pulse group and the second pulse group, the bleaching light is not supplied between output light pulses, and, in the first period set between the first output light pulse and the second output light pulse, the bleaching light from the bleaching light source is supplied to the amplification optical fiber.

* * * * *

UNITED STATES PATENT AND TRADEMARK OFFICE
CERTIFICATE OF CORRECTION

PATENT NO. : 8,363,308 B2  
APPLICATION NO. : 12/863626  
DATED : January 29, 2013  
INVENTOR(S) : Yamaura et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 359 days.

Signed and Sealed this
First Day of September, 2015

Michelle K. Lee
*Director of the United States Patent and Trademark Office*